(12) United States Patent
Yoshizaki et al.

(10) Patent No.: US 10,041,540 B2
(45) Date of Patent: *Aug. 7, 2018

(54) GREASE COMPOSITION AND ROLLING DEVICE

(71) Applicants: JTEKT CORPORATION, Osaka-shi (JP); NIPPON GREASE CO., LTD., Osaka-shi (JP)

(72) Inventors: Koji Yoshizaki, Osaka (JP); Kensuke Suzuki, Osaka (JP); Hiroki Iwamatsu, Kobe (JP); Masashi Mitsuoka, Kobe (JP)

(73) Assignees: JTEKT CORPORATION, Osaka-shi (JP); NIPPON GREASE CO., LTD., Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/384,251

(22) PCT Filed: Mar. 22, 2013

(86) PCT No.: PCT/JP2013/058314
§ 371 (c)(1),
(2) Date: Sep. 10, 2014

(87) PCT Pub. No.: WO2013/141365
PCT Pub. Date: Sep. 26, 2013

(65) Prior Publication Data
US 2015/0078687 A1     Mar. 19, 2015

(30) Foreign Application Priority Data

Mar. 22, 2012   (JP) ................................. 2012-065441

(51) Int. Cl.
*C10M 169/00*    (2006.01)
*C10M 149/20*    (2006.01)
(Continued)

(52) U.S. Cl.
CPC ....... *F16C 33/6633* (2013.01); *C10M 115/08* (2013.01); *C10M 169/02* (2013.01);
(Continued)

(58) Field of Classification Search
CPC .............. F16C 33/6633; F16C 29/0695; F16C 29/064; C10M 169/02; C10M 115/08;
(Continued)

(56) References Cited

U.S. PATENT DOCUMENTS 4,668,411 A * 5/1987 Yasui ................ C07C 273/1827
                                                                508/552
5,852,361 A * 12/1998 Ouchi ................. F16C 33/7886
                                                                324/174

(Continued)

FOREIGN PATENT DOCUMENTS

CN    101652456 A    2/2010
CN    102002414 A    4/2011
(Continued)

OTHER PUBLICATIONS

Office Action of corresponding Chinese application No. 201380014637.X dated Sep. 14, 2015; partial translation of Office Action.
(Continued)

*Primary Examiner* — Pamela H Weiss
(74) *Attorney, Agent, or Firm* — Kratz, Quintos & Hanson, LLP

(57) ABSTRACT

A grease composition which is excellent in seizure resistance can be provided without deteriorating resistance to stirring in the rolling device, and a rolling device in which the grease composition intervenes to a predetermined portion can be also provided by use of a grease composition comprising a base oil and a thickener, the thickener being a diurea compound obtained by allowing an amine mixture
(Continued)

comprising alkylphenylamine, an alkyl group of which has 8 to 16 carbon atoms, and cyclohexylamine, to react with a diisocyanate compound, the amount of cyclohexylamine in the amine mixture being 80% by mole or more and less than 91% by mole, and a worked penetration being 300 to 330.

3 Claims, 5 Drawing Sheets

(51) Int. Cl.
*C10M 105/08* (2006.01)
*C10M 107/24* (2006.01)
*F16C 33/66* (2006.01)
*C10M 115/08* (2006.01)
*C10M 169/02* (2006.01)
*F16C 19/06* (2006.01)
*F16H 57/04* (2010.01)
*F16C 29/06* (2006.01)

(52) U.S. Cl.
CPC ............... *C10M 2207/0406* (2013.01); *C10M 2215/064* (2013.01); *C10M 2215/1026* (2013.01); *C10M 2219/066* (2013.01); *C10N 2230/06* (2013.01); *C10N 2230/08* (2013.01); *C10N 2230/12* (2013.01); *C10N 2230/68* (2013.01); *C10N 2240/02* (2013.01); *C10N 2250/10* (2013.01); *F16C 19/06* (2013.01); *F16C 29/064* (2013.01); *F16C 29/0695* (2013.01); *F16H 57/0464* (2013.01); *F16H 57/0497* (2013.01)

(58) Field of Classification Search
CPC .... C10M 2215/1026; C10M 2219/066; C10M 2215/064; C10M 2207/0406; C10N 2230/12; C10N 2230/06; C10N 2230/68; C10N 2240/02; C10N 2230/08
See application file for complete search history.

(56) References Cited

U.S. PATENT DOCUMENTS

| | | | |
|---|---|---|---|
| 8,951,945 B2* | 2/2015 | Yoshizaki | C10M 169/06 384/462 |
| 2003/0040442 A1* | 2/2003 | Yokouchi | C10M 169/06 508/155 |
| 2010/0029521 A1 | 2/2010 | Kondo | |
| 2012/0269472 A1* | 10/2012 | Yoshizaki | C10M 169/06 384/462 |

FOREIGN PATENT DOCUMENTS

| | | | |
|---|---|---|---|
| EP | 2 514 808 A1 | 10/2012 | |
| EP | 2514809 A1 * | 10/2012 | .......... C10M 169/06 |
| JP | H61-155496 | 7/1986 | |
| JP | 2004-108403 A1 | 4/2004 | |
| JP | 2004-132507 A1 | 4/2004 | |
| JP | 2006-29473 A1 | 2/2006 | |
| JP | 2006-46370 A1 | 2/2006 | |
| JP | 2008-222739 A1 | 9/2008 | |
| JP | 2009-108263 A1 | 5/2009 | |

OTHER PUBLICATIONS

International Search Report for International Application No. PCT/JP2013/058314 dated May 14, 2013.
Supplementary European Search Report dated Mar. 18, 2015, corresponding to European patent application No. 13765251.7.

* cited by examiner

GREASE COMPOSITION AND ROLLING DEVICE

TECHNICAL FIELD

The present invention relates to a grease composition comprising a predetermined thickener and having a predetermined worked penetration, and a rolling device in which the grease composition intervenes to a predetermined portion.

BACKGROUND ART

There has been known that in a rolling device such as a rolling bearing used under high load or vibratory load environment, a lubricant film intervening between a raceway surface and a rolling element is broken during use and lubricating performance declines drastically, thereby causing damage such as wear or seizure on the raceway surface and the surface of the rolling element.

In order to improve seizure resistance of a grease composition, generally, there has been carried out that a grease composition comprising a high viscosity base oil having a kinematic viscosity of 100 $m^2/s$ or more at 40° C. and an extreme pressure agent is used or a used amount of the grease composition is increased. However, while these solutions improve seizure resistance, there is a problem that resistance to stirring in the rolling device is increased.

Also, Patent Document 1 discloses grease prepared using, as a thickener, a diurea compound obtained by allowing an amine mixture comprising alkylphenylamine, an alkyl group of which has 8 to 16 carbon atoms, and cyclohexylamine in a molar ratio of 1:9 to 9:1, to react with a diisocyanate compound. However, it is not considered that a worked penetration is adjusted to 300 to 330.

PRIOR ART DOCUMENT

Patent Document

Patent Document 1: JP 61-155496 A

SUMMARY OF THE INVENTION

Problem to be Solved by the Invention

An object of the present invention is to provide a grease composition which is excellent in seizure resistance without deteriorating resistance to stirring in the rolling device, and a rolling device in which the grease composition intervenes to a predetermined portion, by use of a grease composition comprising a predetermined thickener and having a predetermined worked penetration.

Means to Solve the Problem

The grease composition of the present invention is a grease composition comprising a base oil and a thickener, featured in that the thickener is a diurea compound obtained by allowing an amine mixture comprising alkylphenylamine, an alkyl group of which has 8 to 16 carbon atoms, and cyclohexylamine, to react with a diisocyanate compound, an amount of cyclohexylamine in the amine mixture is 80% by mole or more and less than 91% by mole, and a worked penetration is 300 to 330.

Moreover, the rolling device of the present invention is a rolling device comprising: a first race member having a first raceway surface, a second race member having a second raceway surface, a plurality of rolling elements rotatably arranged between the first raceway surface and the second raceway surface, featured in that the first race member and the second race member can move relative to each other, and the rolling device comprises the grease composition intervening to rolling contact parts and/or sliding contact parts between the plurality of rolling elements and the first raceway surface and rolling contact parts and/or sliding contact parts between the plurality of rolling elements and the second raceway surface.

Effects of the Invention

According to the present invention, a grease composition which is excellent especially in seizure resistance can be provided without deteriorating resistance to stirring in the rolling device, and a rolling device in which the grease composition intervenes to a predetermined portion can be also provided, by use of a grease composition comprising a predetermined thickener and having a predetermined worked penetration.

EMBODIMENT FOR CARRYING OUT THE INVENTION

Figure 1:
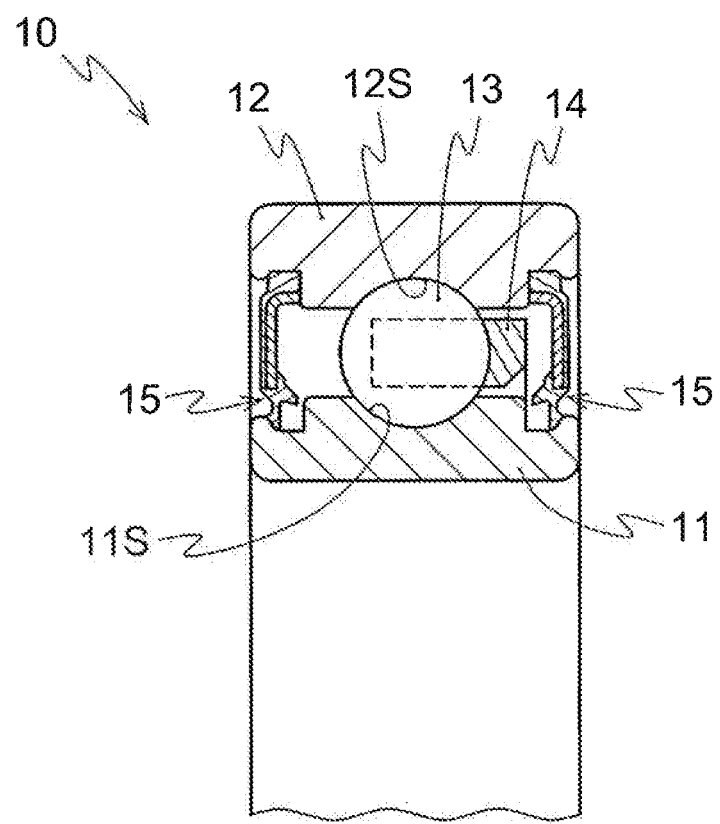
FIG. 1 is a partial cross-sectional view of the deep groove ball bearing according to one embodiment of the present invention.

First, a grease composition of the present invention will be explained. The grease composition of the present invention comprises a base oil and a thickener.

The base oil is not limited particularly as far as it is a base oil to be usually used for grease, and it is possible to use one or two or more of, for example, mineral oils refined from crude oil by optional combination of treatments such as distillation under reduced pressure, solvent deasphalting, solvent extraction, hydrogenolysis, solvent dewaxing, washing with sulfuric acid, clay refining and hydrofinishing; synthetic diester oils, for example, dibutyl sebacate, di-2-ethylhexyl sebacate, dioctyl adipate, diisodecyl adipate, ditridecyl adipate, ditridecyl glutarate, methylacetyl ricinoleate, and the like; synthetic aromatic ester oils, for example, trioctyl trimellitate, tridecyl trimellitate, tetraoctyl pyromellitate, and the like; synthetic polyol ester oils, for example, trimethylolpropane caprylate, trimethylolpropane pelargonate, pentaerythritol-2-ethylhexanoate, pentaerythritol pelargonate, and the like; synthetic ester oils, for example, complex ester oils which are oligo esters of polyhydric alcohol and a fatty acid mixture of dibasic acid and monobasic acid; synthetic polyglycol oils, for example, polyethylene glycol, polypropylene glycol, polyethylene glycol monoether, polypropylene glycol monoether, and the like; synthetic phenyl ether oils, for example, monoalkyltriphenyl ether, alkyl diphenyl ether, dialkyl diphenyl ether, pentaphenyl ether, tetraphenyl ether, monoalkyl tetraphenyl ether, dialkyl tetraphenyl ether, and the like; synthetic hydrocarbon oils, for example, poly-α-olefins such as a co-oligomer of normal paraffin, isoparaffin, polybutene, polyisobutylene, 1-deceneoligomer or 1-decene with ethylene, or hydrides thereof; synthetic silicone oils, for example, dimethyl polysiloxane, diphenyl polysiloxane, alkyl-modified polysiloxane, and the like; and further, synthetic fluorine-containing oils, for example, perfluoro polyether. In particular, alkyl diphenyl ether oil is more preferred from the viewpoint of satisfactory formation of a grease film.

The thickener to be used in the present invention is a diurea compound which is a reaction product of an amine mixture prepared by mixing specific alkylphenylamine with cyclohexylamine, in a specific mixing ratio, and a diisocyanate compound.

In the alkylphenylamine, the number of carbon atoms of its alkyl group is from 8 to 16 from the viewpoint of being environmentally friendly, easily available and good in dispersibility. The number of carbon atoms of the alkyl group is further preferably from 10 to 14 from the viewpoint of being easily available and good in dispersibility. In addition, the alkyl group may be linear or branched, and in the phenyl group, the position substituted by the alkyl group may be any of ortho-position, meta-position or para-position. Specific examples thereof are, for example, one or two or more of octylaniline, decylaniline, dodecylaniline, hexadecylaniline, isododecylaniline and the like. From the viewpoint of good dispersibility, para-dodecylaniline is more preferred.

The amount of the above-mentioned cyclohexylamine is 80% by mole or more and less than 91% by mole in the total amount (100% by mole) of specific alkylphenylamine and cyclohexylamine, since the grease composition having excellent seizure resistance can be obtained. A more preferred amount is 85% by mole or more, further 90% by mole or more, since a thicker fluid film of the grease composition can be obtained.

Aromatic diisocyanates are preferred as the diisocyanate compound to be allowed to react with the amine mixture, from the viewpoint of good heat resistance of the grease, and examples thereof are, diphenylmethane-4,4'-diisocyanate, 2,4-trilenediisocyanate, 2,6-trilenediisocyanate, a mixture of 2,4-trilenediisocyanate and 2,6-trilenediisocyanate, 3,3'-dimethyldiphenyl-4,4'-diisocyanate, and the like. In particular, from the viewpoint of availability, diphenylmethane-4,4'-diisocyanate and 2,6-trilenediisocyanate are preferred, and further, diphenylmethane-4,4'-diisocyanate is preferred from the viewpoint of good heat resistance.

The reaction of the amine mixture with the diisocyanate compound can be carried out by various methods under various conditions, and it is preferable to carry out the reaction in a base oil since a diurea compound having highly uniform dispersibility can be obtained as the thickener. For example, the reaction may be carried out by adding the base oil containing the diisocyanate compound dissolved therein to the base oil in which the specific alkylphenylamine and cyclohexylamine have been dissolved, or by adding the base oil, in which the specific alkylphenylamine and cyclohexylamine have been dissolved, to the base oil containing the diisocyanate compound dissolved therein.

The reaction temperature and time in the above-mentioned reaction are not limited particularly, and may be the same as those used in usual similar reactions. The reaction temperature is preferably from 60° C. to 170° C. from the viewpoint of solubility and volatility of the amine mixture and diisocyanate. The reaction time is preferably from 0.5 to 2.0 hours from the viewpoint of improvement of production efficiency by shortening of the production period of time and also from the viewpoint of completing the reaction of the amine mixture and diisocyanate. The reaction of an amino group of the to amine mixture and an isocyanate group of the diisocyanate compound proceeds quantitatively, and a preferred ratio thereof is 1 mole of the diisocyanate compound to 2 mole of the amine mixture.

The diurea compound which is a reaction product obtained by the above-mentioned reaction is a mixture of a diurea compound (I) resulting from a reaction of both isocyanate groups of the diisocyanate compound with cyclohexylamine, a diurea compound (II) resulting from a reaction of both isocyanate groups of the diisocyanate compound with specific alkylphenylamine, and a diurea compound (III) resulting from a reaction of one isocyanate group of the diisocyanate compound with an alicyclic amine and a reaction of another isocyanate group with an aromatic amine. Here, the diurea compound (I) forms a relatively large thickener fiber, and has a property of being excellent in, such as, shear stability and adhesion to an applied part. The diurea compound (II) forms a relatively small thickener fiber, and has a property of being excellent in, such as, intervening to an applied part. If the amount of the cyclohexylamine in the amine mixture is less than 70% by mole, that is, if the amount of the diurea compound (I) is relatively small, the thickener is in the form of powder. Also, if the amount of the cyclohexylamine in the amine mixture is 95% by mole or more, that is, if the amount of the diurea compound (I) is large, the thicker is in the form of fiber. On the other hand, in the thickener of the present invention, since the amount of the cyclohexylamine in the amine mixture is 80% by mole or more and less than 91% by mole and falls in the intermediate range of the above two ranges, the obtained thickener is also in the intermediate state between the above powder form and the fiber form. By using this thickener and adjusting the worked penetration to a predetermined range, seizure resistance of the grease composition of the present invention can be improved without deteriorating resistance to stirring in the rolling device. It is noted that the diurea compound of the present invention may be a diurea compound in which each of the above diurea compounds (I) to (III) is synthesized and mixed such that the amount of the diurea compound (I) is 60% by mole or more and less than 91% by mole.

The amount of the thickener can be appropriately adjusted such that the worked penetration of the grease composition satisfies the range described below. In order to prevent the worked penetration of the grease composition from becoming excessively high, the amount of the thickener in the total amount of a base oil and the thickener is preferably 9% by mass or more, more preferably 15% by mass or more. On the other hand, in order to prevent the worked penetration of the grease composition from becoming excessively low, the amount of the thickener in the total amount of a base oil and the thickener is preferably 36% by mass or less, more preferably 25% by mass or less.

In the present invention, the worked penetration of the grease composition is 300 or more because channeling of the grease composition in the rolling device can be prevented and the grease composition can be sufficiently fed to the rolling contact surfaces and/or sliding contact surfaces, namely, by using a churning type grease composition, seizure resistance can be improved. On the other hand, the worked penetration is preferably 330 or less from the to viewpoint of preventing flow of the grease composition from the rolling contact surfaces and/or sliding contact surfaces to the outer space of the rolling device, namely, the leakage of the grease composition. In the present invention, the worked penetration is a value obtained by dropping a cone mounted on a cone penetration meter into the grease composition under environment of 25° C., measuring a depth (mm) of 5-second invasion of the cone into the grease composition, and then multiplying the measured depth by 10 in accordance with JIS K2220-7.

In the present invention, various additives such as an antioxidant, an extreme pressure additive, an antiwear additive, a dye, a color stabilizer, a viscosity improver, a structure stabilizer, a metal deactivator, a viscosity index improver and a rust-preventing additive may be added to the grease composition in proper amounts to such an extent not to impair the effect of the present invention. When these additives are contained in the grease composition, it is preferable that the total amount thereof in the grease composition is 10% by mass or less.

The antioxidant is not limited particularly as far as it is an antioxidant to be usually added in a grease composition, and it is preferable to contain an amine antioxidant because not only antioxidant property but also seizure resistance can be provided by being used together with the thickener of the present invention.

Aromatic amine compounds are desirable as the amine antioxidant and examples thereof include diphenyl amine, alkylated diphenyl amine, phenothiazine, N-phenyl-α-naphthylamine, p,p'-diaminodiphenylmethane, aldol-α-naphthylamine, p-dodecylphenyl-1-naphthylamine. In particular, alkylated diphenyl amine is more preferred from the viewpoint of its preferable seizure resistance.

In the case where the grease composition comprises the antioxidant, the amount thereof in the grease composition is preferably 0.3% by mass or more from the viewpoint of providing satisfactory antioxidant property, more preferably 2.7% by mass or more from the viewpoint of providing seizure resistance in addition to antioxidant property and further preferably 2.9% by mass or more. On the other hand, the amount of the antioxidant is preferably 6% by mass or less because the effect that matches the amount cannot be obtained and economic efficiency is deteriorated and further preferably 5% by mass or less.

Examples of the extreme pressure additives include ashless extreme pressure additives such as ashless dithiocarbamate (ashless DTC), sulfurized oil and fat, phosphate, ashless dithiophosphate (ashless DTP) and an S-P extreme pressure additive; and extreme pressure additives other than ashless extreme pressure additives such as antimony dithiocarbamate (SbDTC), bismuth dibutyl dithiocarbamate (BiDTC) and zinc dithiocarbamate (ZnDTC). In particular, ashless extreme pressure additives are preferable because the effect of improving extreme pressure property is high and these are environmentally friendly.

In the case where the grease composition comprises the extreme pressure additives, the amount thereof in the grease composition is preferably 0.1 to 5.0% by mass, more preferably 1.0 to 3.0% by mass from the viewpoint of improving seizure resistance.

In the following, the rolling device of the present invention will be explained referring to the attached drawings. It should be noted that the present invention is not limited to embodiments explained below.

The rolling device of the present invention is a rolling device comprising a first race member having a first raceway surface, a second race member having a second raceway surface, a plurality of rolling elements rotatably arranged between the first raceway surface and the second raceway surface, featured in that the first race member and the second race member can move relative to each other, and the grease composition intervenes to rolling contact parts and/or sliding contact parts between the plurality of rolling elements and the first raceway surface and rolling contact parts and/or sliding contact parts between the plurality of rolling elements and the second raceway surface.

The rolling device can be a rolling bearing.

In the rolling bearing, a first raceway surface is a circular raceway surface, a second raceway surface is a circular raceway surface and the first raceway surface and the second raceway surface are rotatably arranged to each other by the rolling of the plurality of rolling elements.

The rolling bearing can be a radial bearing in which one of the first race member and the second race member is an inner ring or inner shaft, and the other is an outer ring. The radial bearing can be a radial ball bearing such as a deep groove ball bearing, an angular contact ball bearing and a self-aligning ball bearing, or a radial roller bearing such as a cylindrical roller bearing, a long cylindrical roller bearing, a needle roller bearing, a tapered roller bearing and a spherical roller bearing.

Moreover, the rolling bearing can be a thrust bearing in which one of the first race member and the second race member is a shaft washer, and the other is a housing washer. The thrust bearing can be a thrust ball bearing such as a thrust ball bearing and an angular contact thrust ball bearing, or a thrust roller bearing such as a cylindrical roller thrust bearing, a tapered roller thrust bearing, a long cylindrical roller thrust bearing, a needle roller thrust bearing and a spherical thrust roller bearing.

Further, the rolling bearing can also comprise a cage for holding all or several rolling elements of the plurality of rolling elements at intervals respectively, or a seal for demarcating a boundary line between the space where the rolling elements are provided and the outside.

The attached FIG. 1 is a partial cross-sectional view of the rolling bearing 10 (deep groove ball bearing) according to one embodiment of the rolling device of the present invention. This rolling bearing 10 comprises a first race member 11 (inner ring), a second race member 12 (outer ring), rolling elements 13 (ball), a cage 14 for holding the rolling elements 13, and sealing members 15, and a space, which is surrounded by the first race member 11, the second race member 12 and the two sealing members 15 and in which the rolling elements 3 are provided, is formed.

The first race member 11 has a first raceway surface 11S, and the second race member 12 has a second raceway surface 12S, and the first race member 11 and the second race member 12 are arranged so that the first raceway surface 11S and the second raceway surface 12S are faced to each other. A plurality of rolling elements 13 are rotatably arranged between the first raceway surface 11S and the second raceway surface 12S at a given interval in a peripheral direction.

In the rolling bearing 10, the grease composition of the present invention intervenes to rolling contact parts and/or sliding contact parts between the first raceway surface 11S and the rolling elements 13 and/or between the second raceway surface 12S and the rolling elements 13.

The rolling device can be a linear bearing.

In the linear bearing, the first raceway surface is a linear raceway surface and the second raceway surface is a linear raceway surface and the first race member and the second race member are linearly movable to each other by the rolling of the plurality of rolling elements.

The linear bearing can be a linear bearing in which a rolling element is a ball, or a linear bearing in which a rolling element is a roller. Also, the linear bearing can be a recirculating ball linear bearing in which a ball recirculates, or a recirculating roller linear bearing in which a roller recirculates.

Figure 2A:
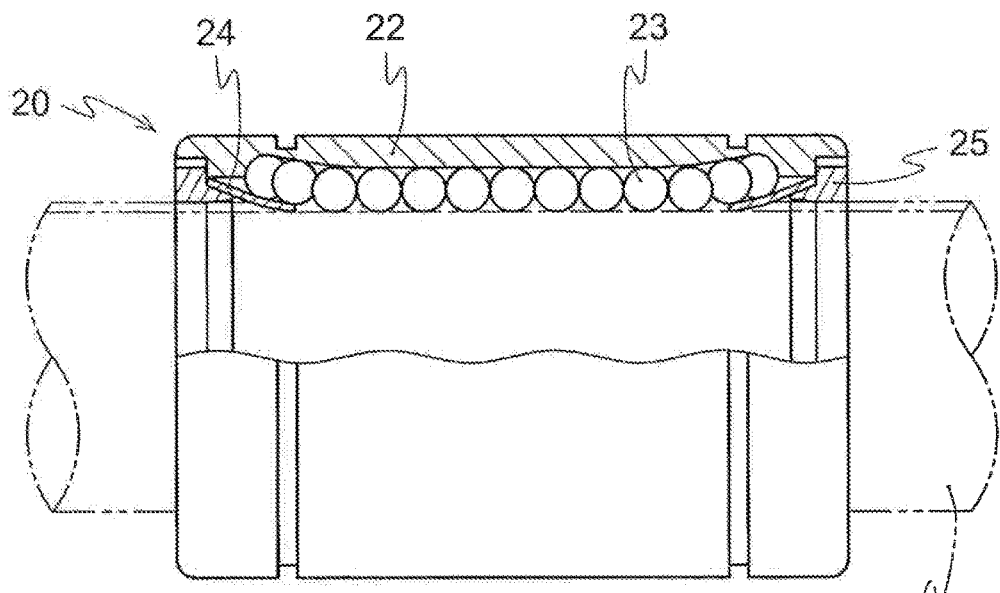
FIG. 2A is a vertical cross-sectional view of the linear bearing (recirculating ball linear bearing) according to one embodiment of the present invention.
Figure 2B:
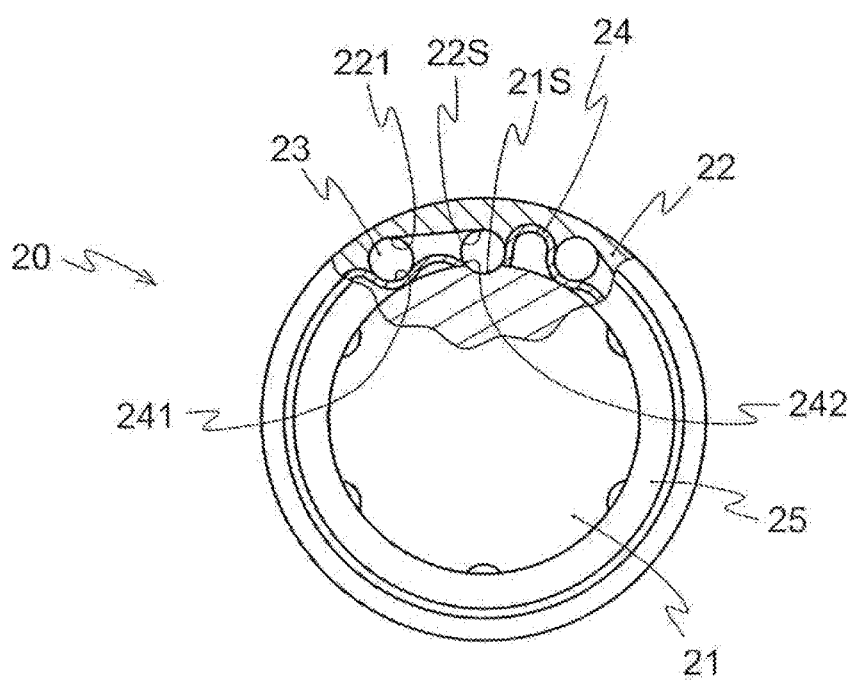
FIG. 2B is a transverse cross-sectional view of the linear bearing (recirculating ball linear bearing) according to one embodiment of the present invention.

The attached FIG. 2A is a vertical cross-sectional view of the linear bearing 20 (recirculating ball linear bearing) according to one embodiment of the rolling device of the present invention; and FIG. 2B is a transverse cross-sectional view of the linear bearing 20 (recirculating ball linear bearing). The linear bearing 20 comprises a first race member 21 (rail), a second race member 22 (movable element), rolling elements 23 (ball), a cage 24 for retaining the rolling elements 23 and retaining cylinders 25 provided at the both ends of the second race member 22, and a space, which is surrounded by the first race member 21, the second race member 22, the cage 24 and the two retaining cylinders 25 and in which the rolling elements 23 are provided, is formed.

The first race member 21 has a plurality of first raceway surfaces 21S and the second race member 22 has a plurality of second raceway surfaces 22S in a linear manner along the axial direction, respectively, and the first race member 21 and the second race member 22 are arranged so that the first raceway surface 21S and the second raceway surface 22S are faced to each other. A plurality of rolling elements 23 are rotatably arranged between the first raceway surface 21S and the second raceway surface 22S at a given interval or otherwise in contact to each other. Here, the second race member 22 is provided with a race groove 221 for a rolling element circulating under no load, as opposed to the second raceway surface 22S.

The cage 24 has a cylindrical shape so curved as to extend along a part of the inner peripheral surface of the second race member 22, and the both ends thereof are retained by the retaining cylinders 25. A plurality of grooves 241 with a bottom and a plurality of grooves 242 without a bottom are provided in the middle portion in contrast. The grooves 241 with a bottom form, together with a race groove 221 for a rolling element circulating under no load, a row of the rolling elements circulating under no load, while the grooves 242 without a bottom is for a row of the rolling elements circulating under load. The row of rolling elements circulating under no load and the contrasting row of rolling elements circulating under load are connected with each other at their both ends in the axial direction to form a rolling element circulating circuit. Thus, along with an axial sliding motion of the first race member 21 and the second race member 22 relative to each other, the rolling elements are circulated via the rolling element to circulating circuit between the row of rolling elements circulating under no load and the row of rolling elements circulating under load.

In the linear bearing 20, the grease composition of the present invention intervenes to rolling contact parts and/or sliding contact parts between the first raceway surface 21S and the rolling elements 23 and/or between the second raceway surface 22S and the rolling elements 23.

Figure 3A:
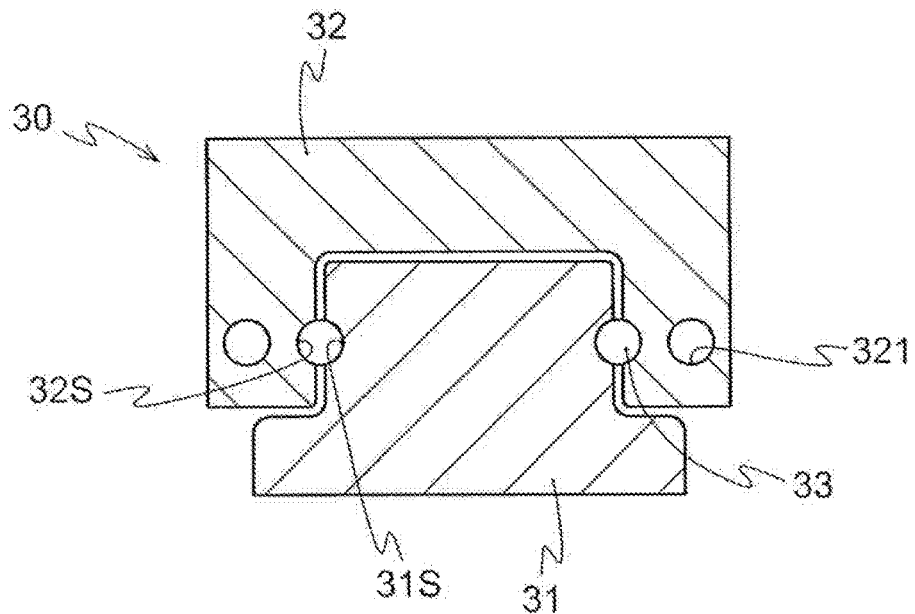
FIG. 3A is a transverse cross-sectional view of the linear bearing (linear motion guide) according to one embodiment of the present invention.
Figure 3B:
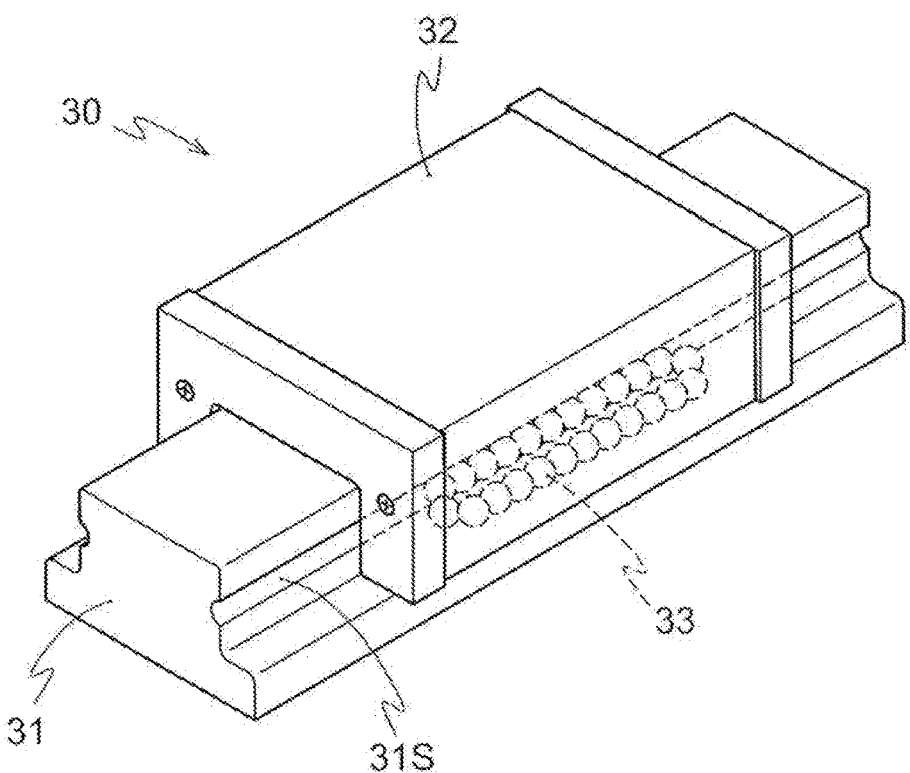
FIG. 3B is a perspective view of the linear bearing (linear motion guide) according to one embodiment of the present invention.

The attached FIG. 3A is a transverse cross-sectional view of the linear bearing 30 (linear motion guide) according to one embodiment of the rolling device of the present invention; and FIG. 3B is a perspective view of the linear bearing 30 (linear motion guide). This linear bearing 30 comprises a first race member 31 (rail), a second race member 32 (movable element) and rolling elements (ball). A space, which is surrounded by the first race member 31 and the second race member 32 and in which the rolling elements 33 are provided, is formed.

In the moving direction of the movable element, the first race member 31 has a first raceway surface 31S (groove of rail) and the second race member 32 has a second raceway surface 32S (groove of movable element), and the first race member 31 and the second race member 32 are arranged so that the first raceway surface 31S and the second raceway surface 32S are faced to each other. A plurality of rolling elements 33 are rotatably arranged between the first raceway surface 31S and the second raceway surface 32S at a given interval or otherwise in contact to each other. Here, the second race member 32 is provided with a race groove 321 for a rolling element circulating under no load, as opposed to the second raceway surface 32S.

In the linear bearing 30, the grease composition of the present invention intervenes to rolling contact parts and/or sliding contact parts between the first raceway surface 31S and the rolling elements 33 and/or between the second raceway surface 32S and the rolling elements 33.

The rolling device can be a ball screw.

In the ball screw, a first raceway surface is a screw groove surface on the surface of a screw groove of a screw shaft and a second raceway surface is a screw groove surface on the surface of a screw groove of a nut, where the screw shaft and the nut are linearly movable to each other by the rolling of the plurality of rolling elements, namely, balls.

Figure 4:
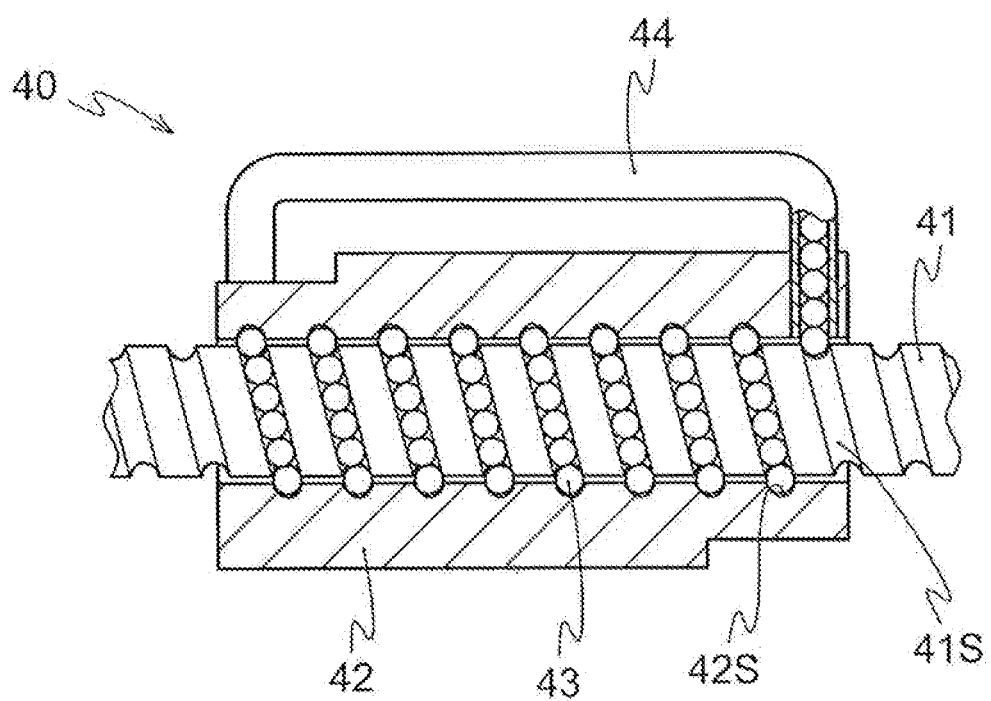
FIG. 4 is a vertical cross-sectional view of the ball screw according to one embodiment of the present invention.

The attached FIG. 4 is a vertical cross-sectional view of the ball screw 40 according to one embodiment of the rolling device of the present invention. This ball screw comprises a first race member 41 (screw shaft), a second race member 42 (nut) and rolling elements 43 (ball). A spiral space, which is surrounded by the first race member 41 and the second race member 42 and in which the rolling elements 43 are provided, is formed.

The first race member 41 has a first raceway surface 41S (screw groove of screw shaft) and the second race member 42 has a second raceway surface 42S (screw groove of nut) respectively in a spiral manner, and the first race member 41 and the second race member 42 are arranged (spirally engaged) so that the first raceway surface 41S and the second raceway surface 42S are faced to each other. A plurality of rolling elements 43 are rotatably arranged between the first raceway surface 41S and the second raceway surface 42S at a given interval or otherwise in contact to each other. Here, the second race member 42 is provided with a circulator tube 44.

In the ball screw 40, the grease composition of the present invention intervenes to rolling contact parts and/or sliding contact parts between the first raceway surface 41S and the rolling elements 43 and/or between the second raceway surface 42S and the rolling elements 43.

The contained amount of the grease composition of the present invention in the rolling device can be changed depending on a shape or dimension and the like of the applied part, but can be approximately the same as the conventional amount.

The present invention will be explained below in detail by means of Examples, but is not limited to these Examples.

Measuring and testing methods are as follows.

Measurement of Worked Penetration

The worked penetration is a value obtained by dropping a cone mounted on a cone penetration meter into the grease under environment of 25° C., measuring a depth (mm) of 5-second invasion of the cone into the grease, and then multiplying the measured depth by 10 in accordance with JIS K2220-7.

Measurement of Seizing Load Limit

Figure 5:
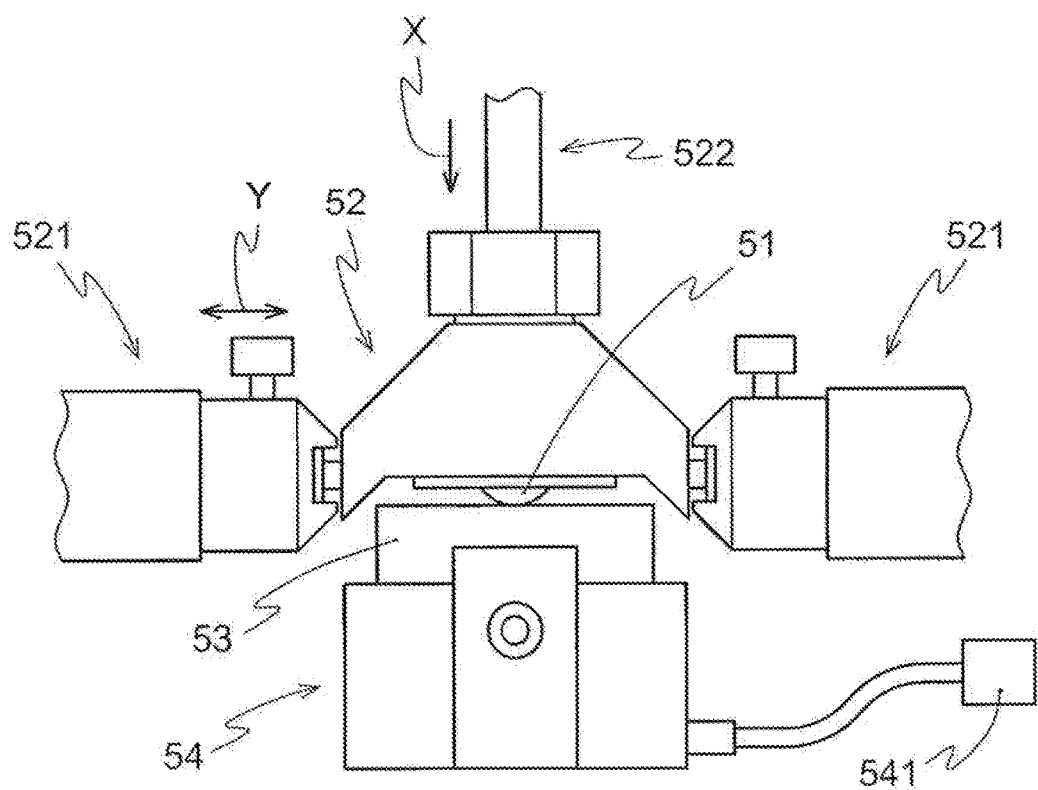
FIG. 5 is a schematic view of a seizing load limit measuring device used in the present invention.

The seizing load limit of a test grease composition is measured with The SRV Test System available from OPTI-MOL Instruments. FIG. 5 is a schematic view of the measurement device (The SRV Test System) to be used. In this measuring device, an upper test piece 51 is arranged on a lower test piece 53 on which a predetermined amount of the grease composition is applied, and the measuring device reciprocates the upper test piece 51 in the Y direction under load in the X direction to detect a frictional force between the lower test piece 53 and the upper test piece 51, thereby being able to measure a seizing load of the grease composition intervening between the lower test piece 53 and the upper test piece 51. Here, the upper test piece 51 is held with an upper test piece holder 52, to which a pair of drive shafts 521 that reciprocates the upper test piece 51 in the Y direction and a load bar 522 that applies load in the X direction are coupled. The lower test piece 53 is held with a lower test piece holder 54, which comprises a heater (not shown) therein for maintaining the temperature of the test piece at a fixed temperature and is connected to a frictional force detecting device 541 that detects a frictional force on the lower test piece 53. The seizing of the grease composition intervening between the lower test piece 53 and the upper test piece 51 is determined by a rapid increase of the frictional force (friction coefficient) between the lower test piece 53 and the upper test piece 51, which is detected by the frictional force detecting device 541.

A particular test method will be shown below. The test grease composition is applied on the lower test piece 53 using a template such that the thickness becomes 0.05 mm and the upper test piece 51 held with the upper test piece holder 52 is set on the applied test grease composition. Then, a reciprocating motion using the drive shafts 521 is started and a load application using the load bar 522 is also started. The load application using the load bar 522 is increased per step, and the load in a step before the step where the frictional force detecting device 541 detects a rapid increase of the frictional force (friction coefficient) between the lower test piece 53 and the upper test piece 51, is determined as the seizing load limit. The larger the seizing load limit is, the more excellent seizure resistance is. It is noted that the test grease composition is applied on the lower test piece 53 before the test only, and is not added after the start of the reciprocating motion.

Test Conditions

Upper test piece: steel ball (SUJ2, normal quenching, diameter: 10 mm)
Lower test piece: flat plate (SUJ2, normal quenching, Rockwell hardness: HRC50 to HRC60)
Temperature of test piece: 120° C.

Here, in normal quenching, quenching is carried out by soaking for 30 minutes at 820 to 850° C., oil cooling, and tempering for 1 to 2 hours at 160 to 180° C.

Load application: Starting from no load (0 N), the load is increased by 50 N per step. When the load reaches 500 N, the load is increased by 100 N per step thereafter. Here, while the load is increased, the reciprocating motion is not stopped and the load is increased taking one to two seconds. It is noted that this time of one to two seconds for increasing the load application is included in the operation time (120 seconds) under the increased load application.

Each step: 120 seconds
Width of reciprocating motion: 1.5 mm
Frequency: 50 Hz

EXAMPLES

In Examples of the present invention, the following materials were used.

Diisocyanate Compound
  MDI: Diphenylmethane-4,4'-diisocyanate
Amine
  CHA: Cyclohexylamine
  PDA: Para-dodecylaniline
Base Oil
  ADE: Alkyl diphenyl ether oil
  Amine antioxidant: VANLUBE SL (trade name) (alkylated diphenyl amine) available from R.T. Vanderbilt Company, Inc.
Extreme Pressure Additive
  Ashless DTC (ashless dithiocarbamate): NA-LUBE ADTC (trade name) available from King Industries International Inc.

Examples 1 to 3 and Comparative Examples 1 to 4

According to Table 1, a starting amine (CHA and/or PDA) as the thickener was mixed to ADE (base oil) being the same parts by mass as the starting amine as the thickener, and the mixture was heated to 100° C. to prepare a solution A. Separately, according to Table 1, a starting MDI as the thickener was mixed to ADE being the same parts by mass as the starting MDI as the thickener, and the mixture was heated to 140° C. to prepare a solution B. Next, the rest of ADE was heated to 100° C. and then, thereto was added the solution A and while stirring the mixture, the solution B was added thereto slowly. Thereafter, the mixture was allowed to stand at 150° C. over 60 minutes, and then cooled to room temperature, and thereto was added an antioxidant and an extreme pressure additive such that the amount (% by mass in grease composition) thereof was as shown in Table 1, followed by homogenization treatment with a 3-roll mill to obtain test grease. With respect to the obtained test grease, measurements of worked penetration and seizing load limit were carried out. The measurement of a seizing load limit was carried out for two samples (sample A, sample B). The results of the evaluation are shown in Table 1.

TABLE 1

|  |  | EXAMPLE | | | COMPARATIVE EXAMPLE | | | |
|---|---|---|---|---|---|---|---|---|
|  |  | 1 | 2 | 3 | 1 | 2 | 3 | 4 |
| Starting material | MDI | 50 | 50 | 50 | 50 | 50 | 50 | 50 |
| of thickener | CHA | 90 | 85 | 80 | 95 | 90 | 85 | 80 |
| (molar ratio) | PDA | 10 | 15 | 20 | 5 | 10 | 10 | 20 |
| Amount of thickener in base oil and thickener (% by mass) |  | 16 | 14 | 12 | 20 | 19 | 16 | 15 |

TABLE 1-continued

|  | EXAMPLE | | | COMPARATIVE EXAMPLE | | | |
| --- | --- | --- | --- | --- | --- | --- | --- |
|  | 1 | 2 | 3 | 1 | 2 | 3 | 4 |
| Additive (% by mass in grease composition) | | | | | | | |
| Antioxidant | | | | | | | |
| Amine antioxidant | 2 | 2 | 2 | 2 | 2 | 2 | 2 |
| Extreme pressure additive | | | | | | | |
| Ashless DTC | 2.2 | 2.2 | 2.2 | 2.2 | 2.2 | 2.2 | 2.2 |
| Evaluation result | | | | | | | |
| Worked penetration | 307 | 305 | 313 | 310 | 285 | 276 | 279 |
| Seizing load limit (N) | | | | | | | |
| Sample A | 800 | 600 | 800 | 400 | 450 | 600 | 600 |
| Sample B | 1100 | 900 | 900 | 500 | 600 | 500 | 600 |

From the results shown in Table 1, it is seen that in Comparative Examples 1 to 4, wherein the amount of CHA and/or worked penetration do not satisfy the predetermined range of the present invention, seizure resistance is not sufficient. On the other hand, it can be seen that in Examples 1 to 3, wherein the amount of CHA and/or worked penetration satisfy the predetermined range of the present invention, seizure resistance is excellent.

EXPLANATIONS OF SYMBOLS

11, 21, 31, 41 First race member
11S, 21S, 31S, 41S First raceway surface
12, 22, 32, 42 Second race member
12S, 22S, 32S, 42S Second raceway surface
13, 23, 33, 43 Rolling element

The invention claimed is:

1. A grease composition comprising a base oil and a thickener,
wherein said thickener is a diurea compound obtained by allowing an amine mixture consisting of para dodecylaniline and cyclohexylamine to react with diphenylmethane-4'4 diisocyanate in a ratio of 2 moles of the amine to 1 mole of diphenylmethane-4'4 diisocyanate, an amount of cyclohexylamine in said amine mixture of 80% by mole or more and less than 91% by mole and an amount of para dodecylanin is more than 9% by mole to 20% by mole thereby totaling 100% by mole,
wherein said base oil is alkyl diphenyl ether oil,
wherein an amount of said thickener in the total amount of said base oil and said thickener is 9 to 25% by mass, and
a worked penetration of the grease composition in accordance with JIS K2220-7 is 300 to 330.

2. A rolling device comprising:
a first race member having a first raceway surface,
a second race member having a second raceway surface, and
a plurality of rolling elements rotatably arranged between said first raceway surface and said second raceway surface,
wherein said first race member and said second race member can move relative to each other, and
said rolling device comprises the grease composition of claim 1 intervening to rolling contact parts and/or sliding contact parts between said plurality of rolling elements and said first raceway surface and rolling contact parts and/or sliding contact parts between said plurality of rolling elements and said second raceway surface.

3. The grease composition of claim 1, wherein the worked penetration is 305 to 313.

* * * * *